United States Patent
Cosatto et al.

(10) Patent No.: US 7,209,882 B1
(45) Date of Patent: Apr. 24, 2007

(54) SYSTEM AND METHOD FOR TRIPHONE-BASED UNIT SELECTION FOR VISUAL SPEECH SYNTHESIS

(75) Inventors: Eric Cosatto, Highlands, NJ (US); Hans Peter Graf, Lincroft, NJ (US); Fu Jie Huang, Plainsboro, NJ (US)

(73) Assignee: AT&T Corp., New York, NY (US)

( * ) Notice: Subject to any disclaimer, the term of this patent is extended or adjusted under 35 U.S.C. 154(b) by 817 days.

(21) Appl. No.: 10/143,717

(22) Filed: May 10, 2002

(51) Int. Cl.
*G10L 15/26* (2006.01)
*G06T 15/70* (2006.01)
*H04M 9/475* (2006.01)

(52) U.S. Cl. .................. 704/235; 704/260; 345/473; 348/515

(58) Field of Classification Search ............ 704/260, 704/235, 256
See application file for complete search history.

(56) References Cited

U.S. PATENT DOCUMENTS

| | | | | |
|---|---|---|---|---|
| 125,949 A * | 8/1872 | Okutani et al. | ............. | 704/258 |
| 137,537 A * | 3/1873 | Guo et al. | ................... | 345/751 |
| 5,278,943 A * | 1/1994 | Gasper et al. | ............. | 704/200 |
| 5,384,893 A * | 1/1995 | Hutchins | .................... | 704/267 |
| 5,502,790 A * | 3/1996 | Yi | ............................. | 704/256 |
| 5,657,426 A * | 8/1997 | Waters et al. | ............... | 704/276 |
| 5,826,234 A * | 10/1998 | Lyberg | ........................ | 704/277 |
| 5,880,788 A * | 3/1999 | Bregler | ........................ | 348/515 |
| 6,006,175 A * | 12/1999 | Holzrichter | ................. | 704/208 |
| 6,385,580 B1 * | 5/2002 | Lyberg et al. | .............. | 704/258 |
| 6,449,595 B1 * | 9/2002 | Arslan et al. | ............... | 704/235 |
| 6,539,354 B1 * | 3/2003 | Sutton et al. | ............... | 704/260 |
| 6,662,161 B1 * | 12/2003 | Cosatto et al. | ............. | 704/260 |
| 6,735,566 B1 * | 5/2004 | Brand | ........................ | 704/256 |
| 6,778,252 B2 * | 8/2004 | Moulton et al. | .............. | 352/12 |
| 6,839,672 B1 * | 1/2005 | Beutnagel et al. | .......... | 704/260 |

OTHER PUBLICATIONS

"Spoken Language Processing" by X. D. Huang, et al., *Prentice-Hall*, 2001, pp. 804-818.
Photo-Realistic Talking Heads by E. Cosatto, et al., *IEEE Trans. on Multimedia*, vol. 2, No. 3, Sep. 2000.

(Continued)

*Primary Examiner*—David Hudspeth
*Assistant Examiner*—Matthew J Sked (57) ABSTRACT

A system and method for generating a video sequence having mouth movements synchronized with speech sounds are disclosed. The system utilizes a database of n-phones as the smallest selectable unit, wherein n is larger than 1 and preferably 3. The system calculates a target cost for each candidate n-phone for a target frame using a phonetic distance, coarticulation parameter, and speech rate. For each n-phone in a target sequence, the system searches for candidate n-phones that are visually similar according to the target cost. The system samples each candidate n-phone to get a same number of frames as in the target sequence and builds a video frame lattice of candidate video frames. The system assigns a joint cost to each pair of adjacent frames and searches the video frame lattice to construct the video sequence by finding the optimal path through the lattice according to the minimum of the sum of the target cost and the joint cost over the sequence.

28 Claims, 7 Drawing Sheets

OTHER PUBLICATIONS

"Rapid Unit Selection from a Large Speech Corpus for Concatenative Speech Synthesis" by M. Beutnagel, et al., *Eurospeech*, 1999.
"Unit Selection in a Concatenative Speech Synthesis System Using a Large Speech Database," by A. Hunt, et al., *ICASSP*, 1996.
"Optimizing Selection of Units from Speech Databases for Concatenative Synthesis" by A. Black, et al., *Eurospeech*, 1995.
"Modeling Coarticulation in Synthetic Visual Speech," by M. Cohen, et al., in Models and Techniques in Computer Animation, *Springer-Verlag*, 1993.
"Audio-Visual Speech Modeling for Continuous Speech Recognition" by S. Dupont, et al., *IEEE Transactions on Multimedia*, vol. 2, No. 3, Sep. 2000.

* cited by examiner

SYSTEM AND METHOD FOR TRIPHONE-BASED UNIT SELECTION FOR VISUAL SPEECH SYNTHESIS

BACKGROUND OF THE INVENTION

1. Field of the Invention

The present invention relates to synthesis of a photo-realistic video sequence and more specifically to an improved system and method of selecting image frames from a multimedia database to generate the video sequence.

2. Discussion of Related Art

Computer-generated talking heads or virtual agents are becoming increasingly popular and technology improves their realistic appearance and sound. Recently there has been increasing interest in a sample-based, or data-driven, face animation approach. Such systems record a large corpus of talking head video sequences and create an inventory of video frames by labeling and indexing these images. During the synthesis of visual text-to-speech (TTS), the system retrieves the appropriate video frames and concatenates them into a video sequence. The process of labeling and indexing images renders the visual TTS process costly and time-consuming.

The difficulty with the concatenative approach is that selecting frames from a large corpus can be very time-consuming, depending on the size of the corpus and the length of the video sequence to be synthesized. Many companies that produce natural-looking talking heads must use recorded samples of mouth movements and therefore face the same problem of how to select frames from a large corpus.

As video synthesis produces more and more photo-realistic heads, an automatic objective measure is needed to quantify the synthesis result. Up to now, quality assessment has been done mostly through subjective tests, where multiple people look at the results. This is a tedious and time-consuming process that cannot be applied in order to tune the synthesis algorithms.

When synthesizing a talking head, the corollary technology to the visual aspect of the talking head is the audio portion, or the TTS technology. Concatenative speech synthesis has become a popular approach in TTS systems. By selecting and concatenating recorded speech segments from a database, this approach produces more natural sounding speech, compared with other methods such as model-based synthesis. In contrast, most of the visual speech synthesis, or speech-synchronous face animation systems, use a synthetic 3D face model with texture mapping. This approach requires only a small corpus of texture images and the animation process involves only texture warping, which is relatively efficient. However, it is unable to capture all the nuances of a real talking head. Moreover, warping the textures sometimes generates artifacts around the mouth region, which makes the head look artificial.

Yet another disadvantage of the traditional methods is that they fail to enable a real-time generation of photo-realistic visual TTS. The requirement of handcrafted labeling and indexing of images eliminates any opportunity to generate real-time visual TTS. As mentioned above, current methods that speed up the generation of visual TTS apply model-based techniques that look artificial and are not convincing. These deficiencies further preclude an acceptable application of visual TTS for interactive virtual agent scenarios where the agent needs to respond in real-time to the interactive input from a user.

Further, until visual TTS technologies improve, their acceptance will be hindered, given the poor impression an unacceptable experience with a virtual agent has on a company's customer. Thus, the unmet challenge in the visual TTS technology is how to provide photo-realistic talking heads in real time.

SUMMARY OF THE INVENTION

What is needed in the art is a system and method for accelerating the synthesis of photo-realistic visual text-to-speech. The system and method disclosed herein accelerate the synthesis of Visual Text-to-Speech by several orders of magnitude. Compared to techniques that search the database frame by frame in order to find the appropriate images, one implementation of the new technique has been shown to be approximately 140 times faster.

The present invention addresses the deficiencies of the prior art and provides a system and method for enabling a fast selection of image frames from a multimedia database and enables the real-time synthesis of photo-realistic talking heads. The invention relates to a fast search algorithm based on, preferably, triphone unit selection. The method is fundamentally different in the way the image data are indexed and accessed. By identifying the appropriate triphone units, the system more quickly identifies the corresponding candidate video frames for the video sequence.

An embodiment of the invention is a method of generating a sequence of a face animation. A system such as, for example, a personal computer with a 1.5 GHz Pentium 4 CPU performs the method steps as instructed by software. Other embodiments of the invention include the steps being implemented using hardware devices or a combination of software and hardware devices. The type of computer system performing the steps according to the invention is unimportant and the various computer systems now available or available in the future can be used to practice the invention.

The method comprises searching a database of phonemes where, preferably, a triphone is the smallest unit of selection. For each target phoneme sequence, the system searches for candidate triphones that are visually and/or phonetically similar according to a target cost. After locating a candidate triphone, the system samples the candidate triphone to obtain the same number of frames as the target triphone. A number of candidate triphones are selected and used to build a video frame lattice. An index exists between each triphone in the database of triphones and the candidate video frames. Accordingly, using the process of selecting triphones from the text-to-speech data, the associated (indexed) candidate video frames are more quickly and efficiently selected to generate the video frame lattice. Finally, the system performs a Viterbi search on the video frame lattice by minimizing a sum of the target cost and a joint cost over the whole sequence.

The higher speed and better efficiency enable a number of applications that would otherwise not be possible or only with special-purpose hardware. Without this technique, one could not generate photo-realistic talking heads in real time and therefore no interactive applications, such as customer service, would be possible.

BRIEF DESCRIPTION OF THE DRAWINGS

The foregoing advantages of the present invention will be apparent from the following detailed description of several embodiments of the invention with reference to the corresponding accompanying drawings, in which.

DETAILED DESCRIPTION OF THE INVENTION

Figure 1:
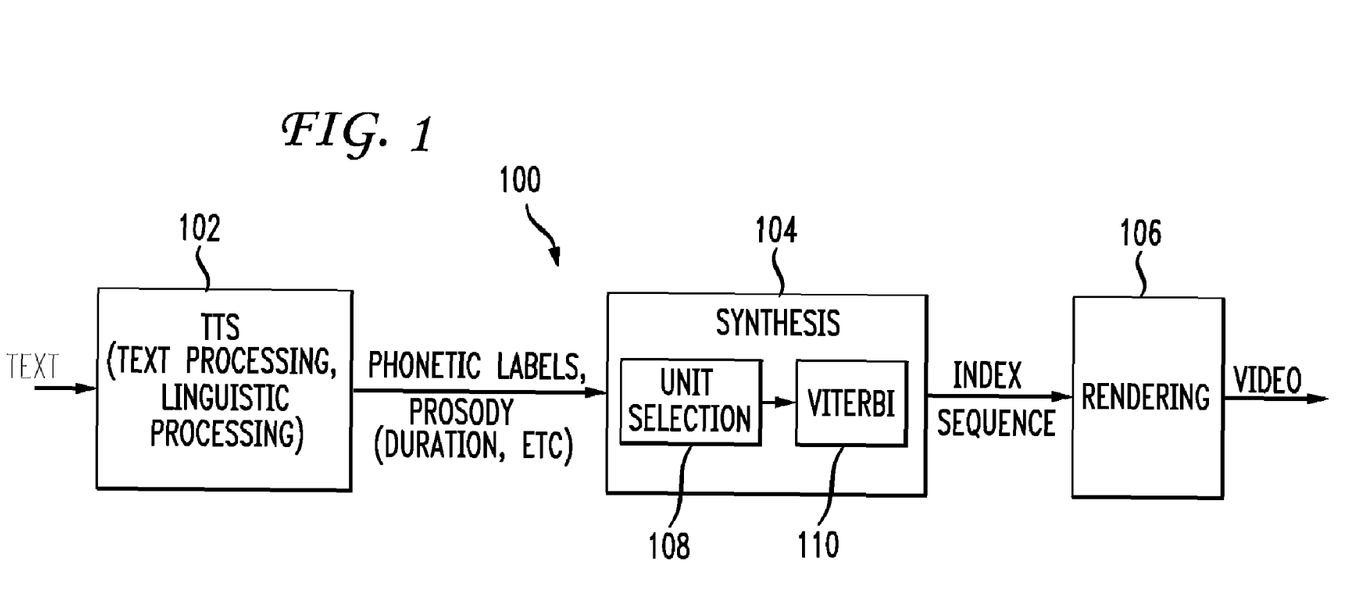
FIG. 1 illustrates the components of a visual Text-to-Speech (TTS) system.

A concatenative visual speech system 100 includes the TTS module 102, which generates a sequence of phonemes and their durations, as shown in FIG. 1. The text can be generated from any source, such as a dialog manager in a spoken dialogue system.

The TTS module 102 includes text and linguistic processing functionality and generates phonetic labels, prosody data, and other data associated with the text, such as duration parameters. A synthesis module 104 receives the TTS input and searches for appropriate video frames from the video inventory and concatenates a series of video frames into a sequence of indices. A rendering module 106, finally, reads video frames according to the indices and generates a video sequence.

The disclosure herein focuses on a system and method of generating a video sequence having mouth movements that are synchronized with speech patterns. The concepts disclosed are also generally applicable to the indexing of multimedia databases, in addition to the specific descriptions and examples provided herein. The present invention utilizes an index that correlates n-phones or triphones with video frames or other media The synthesis module 104 may perform two separate steps represented in FIG. 1 by a unit selection module 108 and a Viterbi search module 110. The unit selection module 108 retrieves multiple candidate units for each target unit in the video to be synthesized. The unit selection module 108 creates a video frame lattice comprising all the candidate units from which the frames for the final video sequence will be selected. The Viterbi search module 110 determines an optimal sequential combination of the frames from the video frame lattice as the resulting video sequence.

Figure 2A:
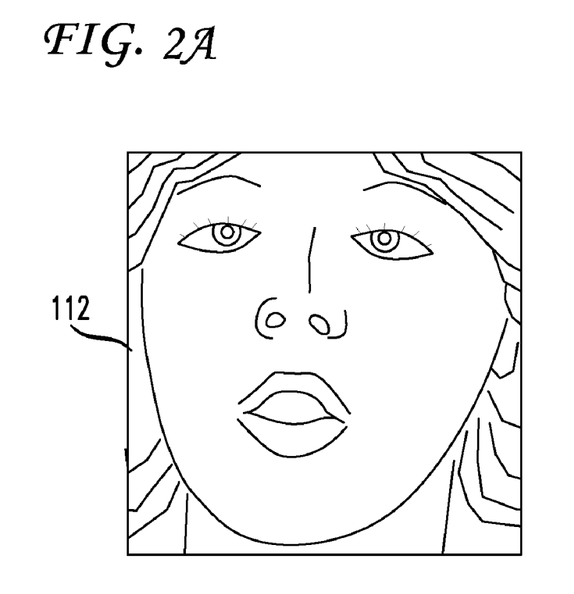
FIGS. 2A and 2B illustrate individual frames within a database of selectable units.
Figure 2B:
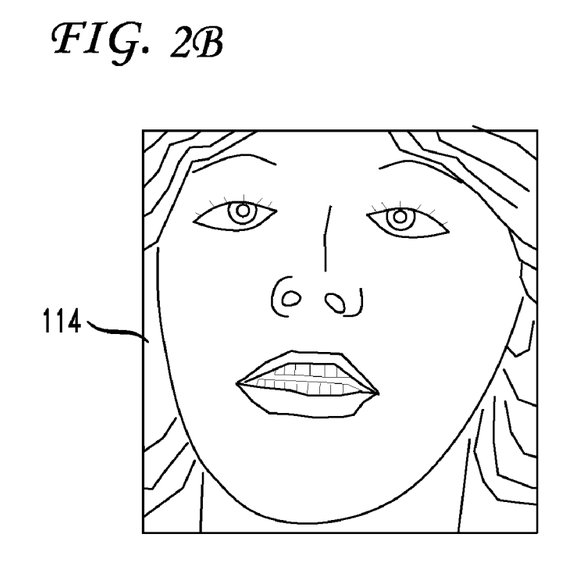

A frame-based unit selection process has been discussed in the literature. For example, E. Cosatto and H. P. Graf, "Photo-Realistic Talking-Heads from Image Samples", *IEEE Trans. on Multimedia*, Vol. 2, No. 3, 2000, incorporated herein by reference, explains that each instance of a unit in the database is one video frame, labeled with features on three levels: (1) Principal Component Analysis (PCA) coefficients that are calculations related to the mouth region; (2) geometrical features related to mouth width and height; and (3) phonetic label and prosody. For example, each frame in the database is phonetically labeled, as shown in FIGS. 2A and 2B. FIG. 2A illustrates the frame 112 for the phonetic label "ao." FIG. 2B illustrates the frame 114 for the phonetic label "iy." Principal Component Analysis is described, for example, in K. Fukunaga, *Introduction to Statistical Pattern Recognition*, Academic Press, New York, 1972. In PCA, the Eigenvalues of the covariance matrix on a set of mouth images are computed. Then a mouth image is projected onto the Eigenvectors with the largest Eigenvalues to compute the coefficients describing the appearance of that image.

For each target frame in the synthesized video, with its phonetic label and prosodic information such as phoneme duration generated by the TTS module 102, the system selects multiple candidate video frames from the database, according to their visual distance from the target frame. This visual distance is defined based on the phonetic labels from an extended DARPA phoneme set. The DARPA phoneme set is a widely used representation of the phonemes in the English language. In this regard, the n-phone or triphone is used to identify promising candidate video frames. The n-phones are used to index the video frame images or even image sequences.

Figure 3:
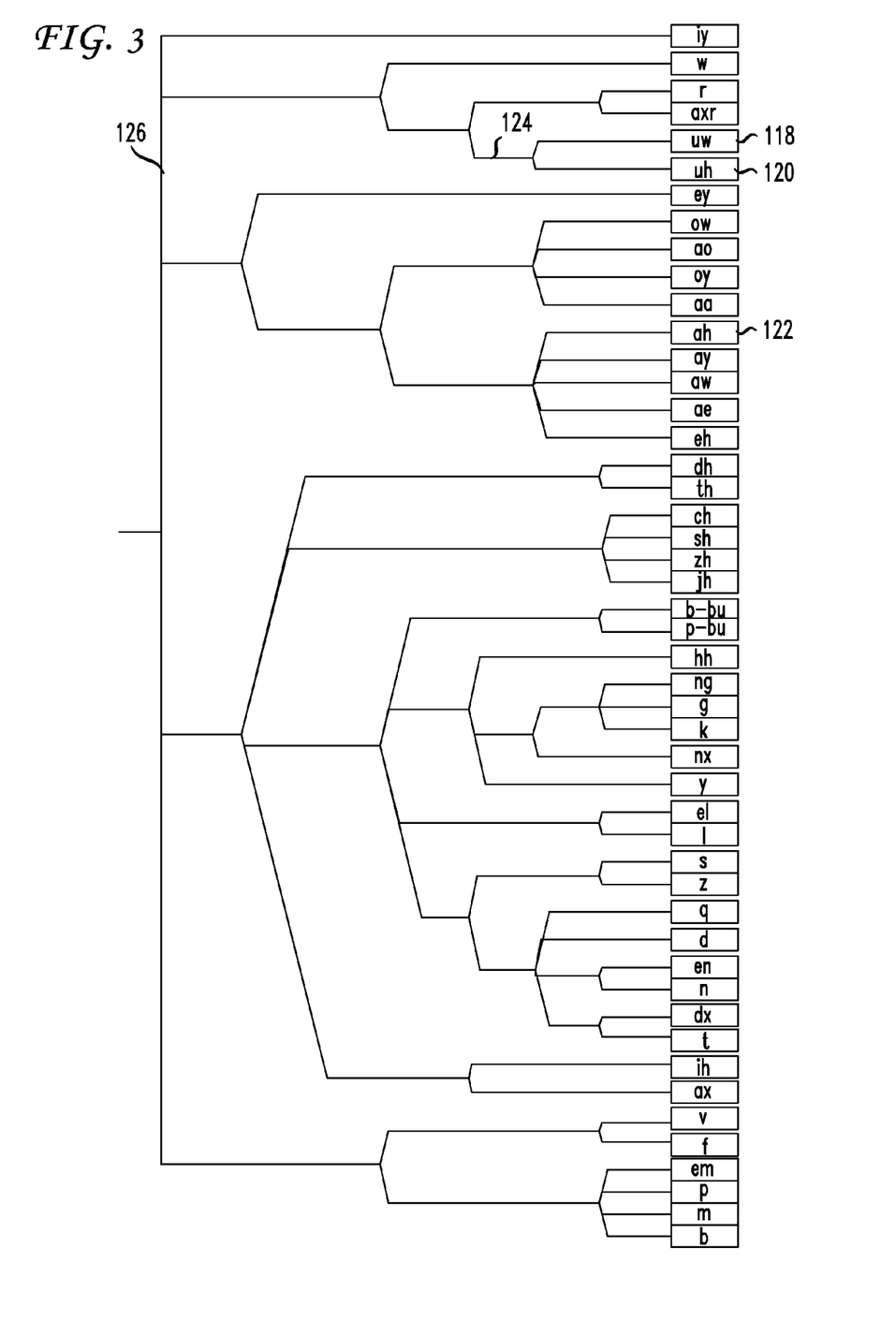
FIG. 3 illustrates visual distances of frames of different phonemes from a phoneme set.

FIG. 3 shows the distance tree of the phonemes in the English language. For any two phonemes, the system finds the smallest sub-tree they both belong to, and the visual distance between them is proportional to the depth of the sub-tree. For example, phoneme "uw" 118 and "uh" 120 each belong to the same depth of sub-tree 124, while "uw" 118 and phoneme "ah" 122 belong to a sub-tree 126 having a much higher level.

In continuous speech, a phoneme with different preceding and following phonemes will be articulated differently. The effect of neighboring sounds influencing each other is called coarticulation. Coarticulation is even more pronounced in the visual domain than in the audible domain. The mouth shape of a phoneme may be different in a different context. Therefore, when the system selects frames, it not only calculates the distance between the current target frame and the candidate frame, but calculates also their neighboring frames' distances. A weighted sum will be the candidate frame's target cost. For example, the weight for the center phoneme of a triphone is 1, while the weights for the first and the third phonemes in the triphone are 0.5. Therefore, if the triphone "ih-ae-n" is compared with the triphone "ih-ae-dx", the target cost is: 0.5*0+1*0+0.5*2=1.

The result of the operation of the unit selection module 108 is a lattice of video frames, with each candidate frame having a target cost. The system assigns a joint cost to each pair of adjacent frames in the lattice. This joint cost is based on the six largest PCA coefficients and two geometrical features of the two frames. For example, as the search algorithm moves from one frame to the next, it calculates the Euclidian distance of the width and height of the mouth plus the first six PCA coefficients.

Assuming that each target frame has N candidate frames, and the whole sequence to be synthesized has T frames, the result is $N^T$ possible combinations to get the final synthesis result. The system uses the Viterbi algorithm to search efficiently for the optimal path by minimizing the sum of target cost and joint cost over the whole sequence.

The frame-based unit selection described above has to search all frames in the database to find candidate frames for each target frame and therefore is very slow. Moreover, often it has to select a large number of candidates for each target frame so that the Viterbi search can find an acceptable result. This makes the complexity of the Viterbi search also very high.

Figure 4:
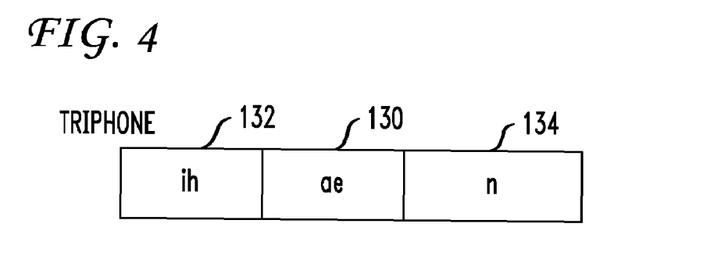
FIG. 4 illustrates a triphone.

The present invention relates to a triphone-based unit selection approach. In this approach, triphones are the smallest selectable unit. FIG. 4 illustrates a triphone having a center frame "ae" 130, a head frame "ih" 132 and a tail frame "an" 134. For each triphone in the target sequence, the system searches for candidate triphones, which are visually and/or phonetically similar according to the target cost defined below. After a candidate triphone is found, the system samples it to get the same number of frames as in the target triphone and builds the video frame lattice. For example, if the center phoneme of the target triphone is twice as long as the center phoneme in the candidate triphone, every frame of the center phoneme in the candidate triphone is inserted twice into the lattice of candidate frames in order to match the length in the target phoneme.

Figure 5:
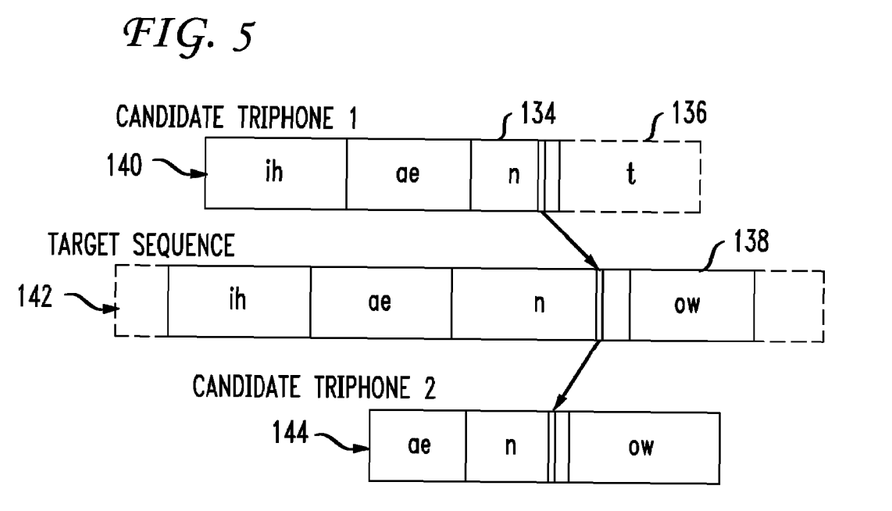
FIG. 5 illustrates the calculation of a position cost.

The target cost calculation in the triphone unit selection is set by taking the following factors into account: (1) Phonetic distance—the system calculates the phonetic distance between corresponding frames in the target and candidate triphone, according to FIG. 5, and then assigns to each candidate frame the sum of these distances; and (2) Coarticulation. By matching on the triphone level, the center phonemes will have a similar phonetic context. As for the head and tail phonemes, there is a risk that their preceding or following context is different, which can be seen in FIG. 5: Tail phoneme "n" 134 from candidate triphone one 140, ih-ae-n, has a following phoneme "t" 136, which does not match the following phoneme "ow" 138 of the target triphone 142, therefore its frames are more likely to have bad matches against the target frames, compared with the frames from triphone candidate two 144, ae-n-ow. The system sets a position cost to frames from the head and tail phonemes, and this cost linearly increases when the frame is further away from the center phoneme.

Speech rate will also influence the appearance of the mouth. For example, usually the phoneme "ae" has a wide-open mouth if articulated normally, but this will not appear when articulated quickly. Subsampling a normal length candidate phoneme to fit into a shorter target phoneme may give the viewer an "over-articulated" perception. In the unit selection according to an aspect of the invention, the system sets a duration mismatch cost to candidate frames.

Overall, each candidate frame's target cost is calculated as:

$$p+c+r$$

where p is the sum of phonetic distances between candidate and target triphone, c is decided by this frame's position in the candidate triphone, and r is determined by phoneme duration differences. The Viterbi search is carried out on the lattice of candidate frames by adding joint cost. This means that when the search algorithm moves from one frame to the next, the cost of visual difference, based on geometric features of the mouth and the PCA coefficient, as described above, is added.

Figure 7:
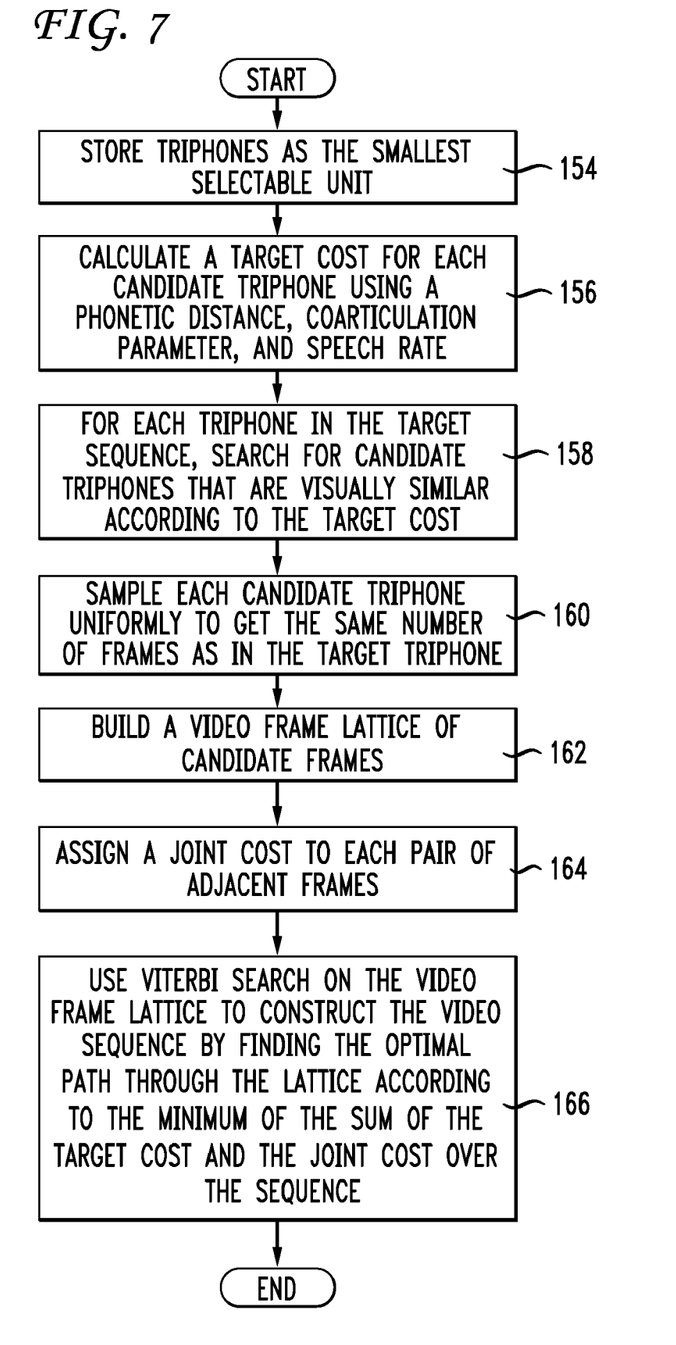
FIG. 7 illustrates a method according to an embodiment of the invention.

FIG. 7 illustrates the steps of the method according to an aspect of the invention. As mentioned above, a computer device or network will perform the steps of the method. The method is not limited to being practiced on a single computer or over a network where the database and the processor performing the steps of the invention are not local to one another. The method comprises storing n-grams or n-phones as the smallest selectable unit (154). The best mode of the present invention is to set n=3 but higher or lower values of n may be used depending on the application and needs of the service. The system calculates the target cost for each candidate triphone using a phonetic distance, coarticulation parameter, and speech rate (156). For each triphone in the target sequence, the system searches for candidate triphones that are visually and/or phonetically similar according to the target cost (158) and samples each candidate triphone to get a same number of frames as in the target triphone (160). The system builds a video frame lattice of candidate frames (162) and assigns a joint cost to each pair of adjacent frames (164). Finally, the system searches through the video frame lattice to construct the video sequence by finding the optimal path through the lattice according to the minimum of the sum of the target cost and the joint cost over the sequence (166).

The system that performs the steps of the method may be a wired or a wireless system as well. Various configurations are contemplated, such as a computer device having a synthesis module comprising a unit selection module that performs various steps of the method, e.g., steps 156–164, as well as a searching module that performs step 166. The specific configuration of the system is immaterial to the present invention since the steps the computer device or devices perform are the focus of the invention.

Databases of recorded sentences are used for generating the visual agents. The database may consist of 300 sentences of a female US English speaker. Each sentence is recorded once, and lasts from 5 to 10 seconds. Recorded at 60 frames per second, the database contains about 90,000 video frames, all labeled according to the discussion above relative to concatenative visual speech synthesis.

Figure 8:
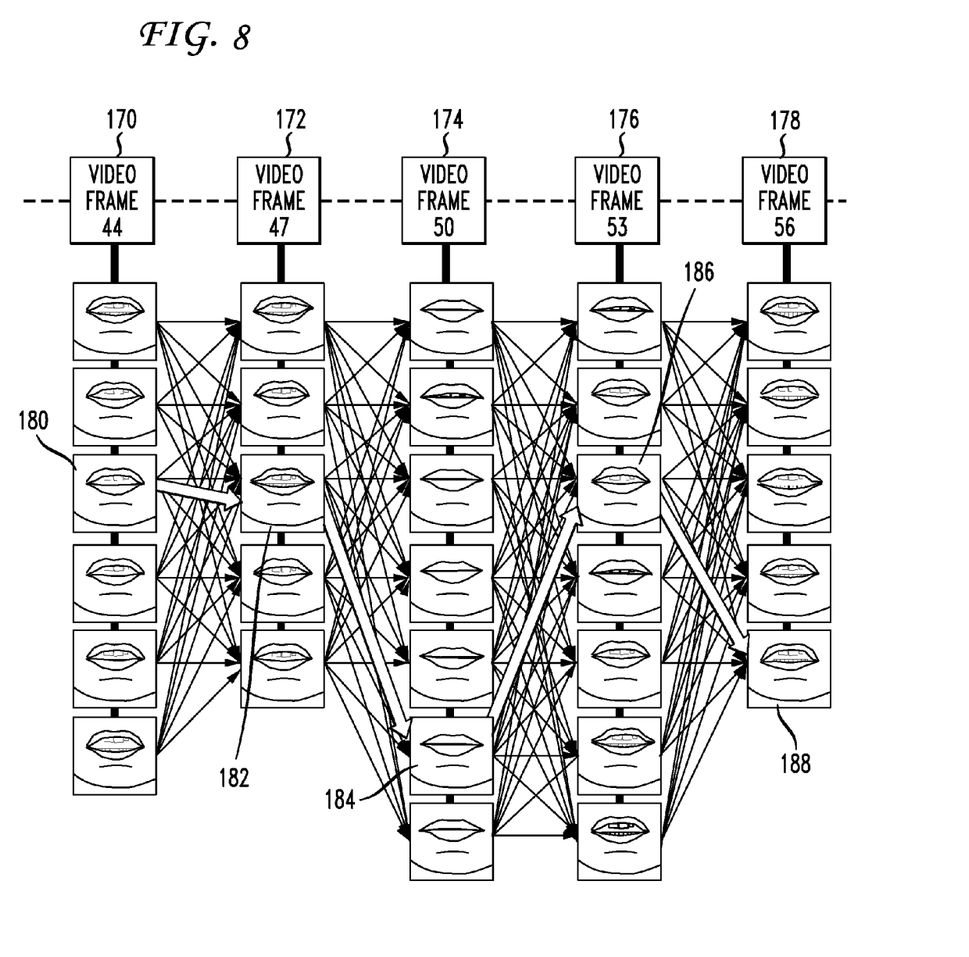
FIG. 8 illustrates a frame lattice showing the selection of video frames to generate a frame sequence.

FIG. 8 provides an example frame lattice according to the process of generating the video frame sequence. Video frames 170, 172, 174, 176 and 178 are shown along to top row of FIG. 8. Each column under each respective video frame represents one time step with all the candidate frames. The Viterbi algorithm searches through each time step for the path with the lowest cost. In the example of FIG. 8, candidate frames 180, 182, 184, 186 and 188 represent the lowest cost path of frames organized to generate the video frame sequence.

An exemplary database contains, for example, about 9,580 triphones. According to FIG. 3, which indicates the existence of 48 phonemes, the total number of all possible triphones is 103,776 (=48*47*46). This is the number of possible combinations of 3 phonemes or triphones from a database of 48 phonemes. Many phonemes have similar mouth shapes and therefore can be grouped together as visually interchangeable.

These groups are sometimes referred to as "visemes". The system groups the phonemes which belong to the same sub-tree whose depth is smaller than 3. The visemes may be organized as "n-visemes" where n can be any number. For example, phonemes ow, ao, oy and aa will be considered the same viseme, as FIG. 3 shows they all belong to the same subtree. Two triphones with these phonemes at the same place will be considered the same during the unit selection process. The total number of these triphones (or tri-visemes) is 6,840, with 2,967 of them presented in the database. And since a candidate frame can be selected from the head, center, or tail phoneme of a triphone, the likelihood that no candidate frame can be found is very low. The number represented herein is, by way of example, according to current tests. They are not considered as essential or limiting on the scope of the invention in that increased computing power and storage capacity will cause these numbers to change in practice.

When no candidate frame (or very few frames) can be selected from triphones in the database, the system selects them from appropriate diphones. The database covers all possible grouped diphones (or di-visemes). Therefore each target frame will have multiple candidate frames generated by the unit selection process. The average number of candidate frames is around 30. Where the smallest selectable unit is an n-phone, where n is greater than 1, if n-phone candidates cannot be selected, the system selects candidate (n−1)-phones from a database of (n−1)-phones. For example, as mentioned above, if triphones cannot be selected, the system selects diphones. In another aspect of the invention, if only a certain threshold number of n-phones candidates are selected, then the system selects (n−1)-phone candidates from a database of (n−1)-phones. An example threshold could be 30 n-phones.

Experiments on a standard desktop PC with a 1.5 GHz P4 CPU demonstrate the triphone-based visual synthesis, excluding the TTS module and the hardware-dependent rendering module, as shown in FIG. 1, runs 50 times faster than real-time. That is, a 5 second video sequence at 60 frames per second takes only 0.1 second to find an optimal sequence of target frames. These demonstrated values are not meant to limit the scope of the invention but merely illustrate speeds and current computing power available. As computing power increases, the period of time the system takes to generate the optimal sequence of target frames will continue to decrease.

By comparing this approach with previous frame-based implementations, the triphone-based method of the present invention is significantly faster, while the synthesis results have similar quality. The reason for the improvement of speed is two-fold: first, with triphones as a unit, the number of units in the database is much smaller, and once an appropriate candidate triphone is found, all of the frames in this triphone can be used as candidate frames for corresponding target frames. This makes the unit selection about 100 times faster. Second, with the triphone-based approach, the average number of candidate frames for each target frame is bounded by the number of matching triphones and diphones, and is about 30. In the frame-based method, this number is bounded by a manually set threshold, typically set to 300, to get acceptable results. This makes the complexity of the Viterbi search in the previous case 30 times higher.

As the synthesis becomes more and more realistic, it is essential to evaluate and compare the results of different synthesis approaches, and different parameter tunings in the same approach. Subjective testing is usually time-consuming and expensive, and the results vary across viewers with different backgrounds. An objective testing method can simulate the subjective measurements.

Another experiment involved selecting 20 recorded sequences from the database as the ground-truth data, and synthesizing each sequence with the sequence itself excluded from the database being used. The synthesized sequence was compared against the recorded sequences to get a score measuring the quality of the synthesis. The three measuring criteria are defined as:

(1) Precision: First, for each synthesized phoneme, the average of the Euclidean distance between its frames and those in the corresponding recorded phoneme was calculated, based on the width, the height and the PCA coefficients of each frame.

(2) Smoothness: If two adjacent frames in the synthesized sequence are selected from different places of different sequences in the database, they are very likely to be visually different. There is a "switch" at this position. The Euclidean distance at all switches in a phoneme is accumulated to decide if a phoneme is smooth or jerky.

(3) Synchronicity: If multiple adjacent phonemes are not synthesized accurately, then the human viewer will think the visual and audio channels are not synchronized. By checking the synthesized frames' phonetic label, it can be determined whether there is a synchronous problem.

In the measurement, the system does not take every phoneme into account. Instead, the system only cares about the phonemes with high visual impact for the human viewers. Such phonemes are the ones that have a turning point and/or an open closure point.

Figure 6:
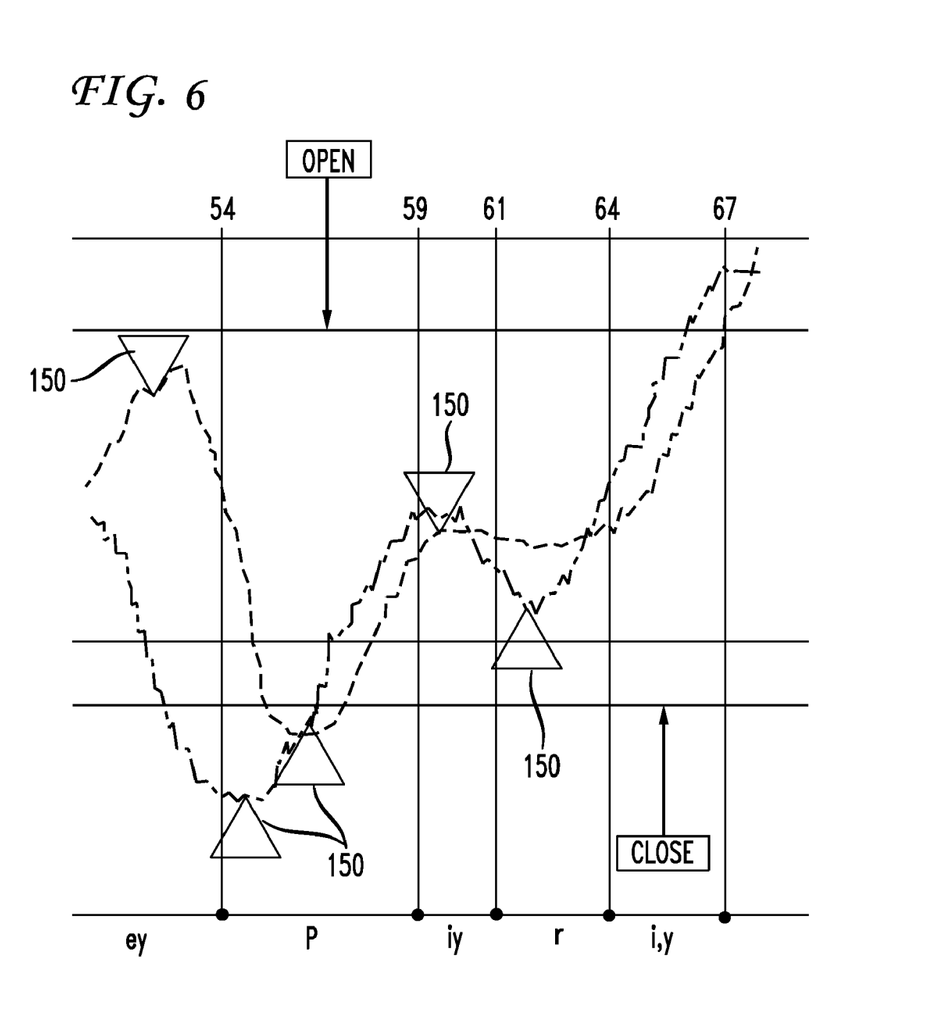
FIG. 6 illustrates turning points and mouth open and closures.

When the speaker's mouth changes the direction of movement from opening to closing, or vice versa, there is a turning point in this phoneme. FIG. 6 shows curves of the mouth height change. The triangles 150 show mouth movement changes at those frames. Human viewers are very sensitive to phonemes with tuning points.

Open and closed mouths are very salient mouth shapes and therefore visually important to human viewers. The phonemes are marked with open or closed mouths by thresholding the mouth height, as shown in FIG. 6, and measuring their difference.

After extracting visually important phonemes, their precision, smoothness and synchronicity scores are accumulated to get a final measurement. Table 1 shows scores for the frame-based and triphone-based synthesis approaches. This measurement clearly shows that the triphone-based synthesis works better in terms of precision and synchronicity.

TABLE 1

Objective scores of two synthesis methods

|  | Frame based | Triphone based |
|---|---|---|
| Precision | 3 | 4.61 |
| Synchronicity | 3 | 4.39 |
| Smoothness | 3 | 2.48 |

Note that in the objective measurement, relative scores of different methods are important, while the absolute scores are decided by the distance-to-score mapping, which can be manually set. Therefore, in Table 1, scores in the first column are all normalized to 3.

A triphone-based unit selection approach is disclosed that can synthesize high quality talking head sequence with a small fraction of the sequence's real-time length. An objective measurement scheme compares synthesis results of different approaches. Embodiments of the invention include methods of generating a video sequence, a system or apparatus that performs the steps of generating a video sequence, a computer-readable medium storing a program to control a computer device to perform the steps of generating a video sequence, and a virtual agent generated according to the concepts disclosed herein. The core concepts disclosed according to the embodiments of the invention enable real-time human/computer interaction where the human can speak to a talking head or other entity that has an acceptable visual appearance and acceptable audible speech. Further, the present invention enables an acceptable synchronization of the audio and video for a virtual agent in real time that provides an enjoyable experience for the user.

The method has application in many fields because it enables the use of photo-realistic talking heads. For example, customer service applications will benefit since they require real-time synthesis of the animations. With this method, such services as "How may I help you" or "Help Desk" interfaces on the Internet become more real and will speed up the acceptance of human/computer interactive agents.

Although the above description may contain specific details, they should not be construed as limiting the claims in any way. Other configurations of the described embodiments of the invention are part of the scope of this invention. For example, the method is not limited to talking heads, but is universally applicable where images in a multimedia database have to be accessed. Typically, accessing such databases is done by indexing images and video clips with text information, symbolic descriptions or by image features. The new technique uses n-grams or n-phones for indexing images or image sequences.

An aspect of the present invention relates to using n-phones to index the video images or image sequences in the database. The parameter "n" can be a different number—as low as 1, or much higher than 3—depending on the application. The use of n-phones for indexing video frames makes better use of the information and does not require a semantic interpretation of the text or any other high-level analysis. Rather, an n-phone unit can be extracted readily from text or from a speech signal. The 'granularity' of the index, i.e. how specifically one wants to access the data, can be adjusted by changing the length of the n-gram. The highest accuracy of the access is achieved if a phonetic transcript with time stamps is available, but the method also works, albeit less accurately, with just plain text. Accordingly, the appended claims and their legal equivalents should only define the invention, rather than any specific examples given.

We claim:

1. A method of generating a video sequence having mouth movements synchronized with speech sounds, the method utilizing a database of n-phones as a smallest selectable unit, where n is larger than 1, the method comprising:

calculating a target cost for each candidate n-phone for a target sequence using a phonetic distance, coarticulation parameter, and speech rate;

for each target frame in the target sequence, searching for candidate n-phones that are phonetically and/or visually similar according to the target cost;

sampling each candidate n-phone to get a same number of candidate phone frames as in the target sequence;

building a video frame lattice of candidate video frames based on the candidate n-phones;

assigning a joint cost to each pair of adjacent video frames; and constructing the video sequence according to a Viterbi search on the video frame lattice by finding the optimal path through the lattice according to the minimum of the sum of the target cost and the joint cost over the sequence.

2. The method of claim 1, wherein where n-phone candidates cannot be selected, the method further comprises selecting candidate (n−1)-phones from a database of (n−1)-phones.

3. The method of claim 1, wherein if the number of n-phone candidates selected for a target frame is below a threshold, then method further comprises selecting candidate (n−1)-phones from a database of (n−1)-phones.

4. The method of claim 3, wherein the threshold number of n-phone candidates selected for a target frame is approximately 30.

5. The method of claim 1, wherein the database of n-phones further comprises a plurality of n-visemes.

6. The method of claim 5, wherein each n-viseme represents at least two n-phones sharing similar characteristics.

7. The method of claim 6, wherein each n-viseme is a tri-viseme.

8. The method of claim 1, wherein n=3.

9. A method of generating a video sequence having mouth movements synchronized with speech sounds, the method utilizing a database of n-phones as a smallest selectable unit, where n is larger than 1, the method comprising:

searching the database of n-phones for a plurality of candidate n-phones for each target frame of a target sequence;

building a video frame lattice of candidate video frames according to the candidate n-phones; and searching the video frame lattice using a Viterbi search to construct the video sequence by finding the optimal path through the lattice according to the minimum of the sum of the target cost and the joint cost over the sequence.

10. A system for generating a video sequence having mouth movements synchronized with speech sounds, the system utilizing a database of n-phones as a smallest selectable unit, where n is larger than 1, the system comprising:

(1) a unit selection module that performs the steps of:
  (a) calculating a target cost for each candidate n-phone for a target frame in a target sequence using a phonetic distance, coarticulation parameter, and speech rate;
  (b) for each n-phone in the target sequence, searching for candidate n-phones that are visually and/or phonetically similar according to the target costs;
  (c) sampling each candidate n-phone to get a same number of frames as in the target sequence;
  (d) building a video frame lattice of candidate video frames; and
  (e) assigning a joint cost to each pair of adjacent candidate video frames; and (2) a search module that performs the step of:
  (a) searching the video frame lattice to construct the video sequence by finding the optimal path through the lattice according to the minimum of the sum of the target cost and the joint cost over the sequence.

11. The system of claim 10, wherein n=3.

12. An apparatus for generating a video sequence having mouth movements synchronized with speech sounds, the system utilizing a database of n-phones as a smallest selectable unit, where n is larger than 1, the apparatus being controlled by a program implementing a series of steps comprising:

calculating a target cost for each candidate n-phone for a target sequence using a phonetic distance, coarticulation parameter, and speech rate;

for each target frame in the target sequence, searching for candidate n-phones that are visually and/or phonetically similar according to the target cost;

sampling each candidate n-phone to get a same number of candidate frames as in the target sequence;

building a video frame lattice of candidate video frames;

assigning a joint cost to each pair of adjacent video frames; and constructing the video sequence using a Viterbi search on the video frame lattice by finding the optimal path through the lattice according to the minimum of the sum of the target cost and the joint cost over the sequence.

13. The computer-readable medium of claim 12, wherein the database of n-phones comprises a plurality of n-visemes.

14. A computer-readable medium storing a program for controlling a computer device to perform a set of steps for generating a video sequence having mouth movements synchronized with speech sounds, the method utilizing a database of n-phones as a smallest selectable unit, where n is larger than 1, the set of steps comprising:

calculating a target cost for each candidate n-phone for a target sequence using a phonetic distance, coarticulation parameter, and speech rate;

for each target frame in the target sequence, searching for candidate n-phones that are phonetically and/or visually similar according to the target cost;

sampling each candidate n-phone to get a same number of candidate frames as in the target sequence;

building a video frame lattice of candidate video frames;

assigning a joint cost to each pair of adjacent video frames; and generating the video sequence using a Viterbi search on the video frame lattice by finding the optimal path through the lattice according to the minimum of the sum of the target cost and the joint cost over the sequence.

15. The computer-readable medium of claim 14, wherein when n-phone candidates cannot be selected, the set of steps further comprises selecting candidate (n−1)-phones from a database of (n−1)-phones.

16. The computer-readable medium of claim 14, wherein if the number of n-phone candidates selected for a target frame is below a threshold, then the set of steps further comprises selecting candidate (n−1)-phones from a database of (n−1)-phones.

17. The computer-readable medium of claim 16, wherein the threshold number of n-phone candidates selected for a target frame is approximately 30.

18. The computer-readable medium of claim 17, wherein each n-viseme represents at least two n-phones sharing similar characteristics.

19. The computer-readable medium of claim 18, wherein each n-viseme is a tri-viseme.

20. The computer-readable medium of claim 14, wherein n=3.

21. A method of generating a video sequence having mouth movements synchronized with speech sounds, the method comprising:

receiving data associated with speech generated from text;

calculating a target cost for each candidate n-phone for a target sequence;

for each target frame in the target sequence, searching for candidate n-phones that are phonetically and/or visually similar according to the target cost in a database where the n-phones are the smallest selectable unit;

building a video frame lattice of candidate video frames; and constructing the video sequence according to a Viterbi search on the video frame lattice by finding the optimal path through the video frame lattice according to the minimum of the sum of the target cost and a joint cost over the sequence.

22. The method of claim 21, wherein the joint cost is assigned to each pair of adjacent video frames.

23. The method of claim 22, further comprising:

sampling each candidate n-phone to get a same number of candidate frames as in the target sequence.

24. The method of claim 23, wherein calculating the target cost for each candidate n-phone is performed using a phonetic distance, coarticulation parameter, and speech rate.

25. The method of claim 24, wherein n=3.

26. A virtual agent that interacts in real time with a user, the virtual agent being controlled according to a method of generating a video sequence utilizing a database of n-phones as a smallest selectable unit, where n is larger than 1, the method comprising:

calculating a target cost for each candidate n-phone for a target sequence using a phonetic distance, coarticulation parameter, and speech rate;

for each target frame in the target sequence, searching for candidate n-phones that are phonetically and/or visually similar according to the target cost;

sampling each candidate n-phone to get a same number of candidate frames as in the target sequence;

building a video frame lattice of candidate video frames;

assigning joint cost to each pair of adjacent video frames; and generating movements for the virtual agent by constructing video sequences according to a Viterbi search on the video frame lattice by finding the optimal path through the lattice according to the minimum of the sum of the target cost and the joint cost over the sequence.

27. The virtual agent of claim 26, wherein n=3.

28. A method of generating a video sequence having mouth movements synchronized with speech sounds the method utilizing a database of n-phones as a smallest selectable unit where n is larger than 1, the method comprising:

receiving text-to-speech data;

selecting a plurality of n-phones from the database of n-phones;

building a video frame lattice of candidate video frames based on the selected plurality of n-phones, wherein each candidate video frame is indexed to an n-phone in the database of n-phones; and constructing the video sequence from the video frame lattice using a Viterbi search on the video frame lattice by finding the optimal path through the lattice according to the minimum of the sum of a target cost and a joint cost over the video sequence.

* * * * *